United States Patent Office 2,937,926
Patented May 24, 1960

2,937,926

METHOD OF PREPARING SYNTHETIC ANHYDRITE

Hellmut Hanusch, Neustadt an der Weinstrasse, Germany, assignor, by mesne assignments, to Rofusa N.V., Willemstad, Curacao, Netherlands, Antilles, a corporation of the Netherlands, Antilles No Drawing. Filed Mar. 14, 1957, Ser. No. 645,905

Claims priority, application Germany Dec. 29, 1956

3 Claims. (Cl. 23—122)

This invention relates to inorganic binders, and more particularly to a method of preparing a binder from a synthetic anhydrite.

In the production of hydrofluoric acid from fluorite, calcium sulfate is obtained as a byproduct, in the following manner.

$$CaF_2 + H_2SO_4 = 2HF + CaSO_4$$

This anhydrite which in contradistinction to natural anhydrite, is the result of a chemical synthesis, belongs to the group of synthetic anhydrites.

For a great many years, this anhydrite was regarded as a waste product and dumped on waste heaps, or into a river. Lately, when dumps became crowded and the contamination of rivers met with growing opposition, attempts were started in earnest to find applications for this substance. These attempts bore fruit as long as the process was of the discontinuous, batch type involving the reaction of precisely measured quantities of fluorite and sulfuric acid, in heated rotary steel drums. This batch process, however, has become obsolete. In modern plants, the hydrofluoric acid is recovered in a continuous operation wherein the heated rotary steel drums are charged and discharged without interruption.

The preparation of synthetic anhydride involves the problem of neutralization of any remnants of sulfuric acid still contained in the $CaSO_4$.

This problem was susceptible of a relatively easy solution in the case of the batch process wherein toward the end of the reaction period, white hydrate of lime—$Ca(OH)_2$—was charged into the steel drums so as to neutralize the sulfuric acid into calcium sulfate. The water liberated in the course of this reaction was removed from the drums along with the volatile hydrofluoride gas.

This procedure, manifestly, is not feasible in conjunction with a continuous process where the neutralization can be effected only after the $CaSO_4$ has been discharged from the steel drums. The problem is worsened by the fact that the excess of sulfuric acid which in the batch process, hardly exceeds 1 to 2 percent, is materially increased, up to about 10 percent, in the continuous process. This increase is due to the fact that for purposes of an optimum yield of hydrofluoric acid, the excess of sulfuric acid must be increased to take care of variations in the calcium fluoride content of the fluorite.

Under the conditions noted, it is evident that this problem, when properly confronted, called for a painstaking investigation and evaluation of prospective neutralizing agents, with the aim of discovering an agent yielding the desired high quality, synthetic anhydrite product.

This neutralizing agent, an analysis of the problem showed, had to meet the following requirements:

(1) The neutralization must be complete. Once the mechanical mixing—of the neutralizing agent and the acid containing anhydrite—has been accomplished, the anhydrite must no longer contain any acid residue (pH exceeding 7). If the neutralization is incomplete, the sulfuric acid residue attracts water. In consequence, lumps are formed, a part of which even harden (as the stored water is hydrated), and differences in the pH value result. The phenomena render the anhydrite quite useless. A high reactivity of the neutralizing agent, thus emerges as the prime requisite for a complete neutralization.

(2) The neutralizing agent should introduce into the anhydrite, the lowest possible quantity of foreign substances which means that the neutralizing agent itself should be as pure as possible. In this connection, it must be taken into account that impurities which by themselves would be quite harmless, can be converted, under the influence of the sulfuric acid, into sulfates which have a strong, uncontrollable influence on the characteristics of the neutralized anhydrite.

Impurities encountered may include cleavage products originating in the course of neutralization, such as, quite particularly, the water liberated during the neutralization which in the continuous process, is not exhausted along with the volatile hydrofluoride gas, but passes into the anhydrite where it is either absorbed as moisture, or else chemically combined as water of hydration. In either case, the water tends to materially impair the characteristics of the anhydrite.

(3) Inasmuch as the content of an excess of sulfuric acid in the $CaSO_4$ varies—frequently quite materially—the neutralizing agent must be added in excess, too. Considering the requirements noted under 2, the neutralizing agent must be capable of binding a maximum quantity of sulfuric acid.

It is a primary object of this invention to provide a neutralizing agent answering the above requirements, and to thereby convert synthetic anhydrite recovered in a continuous process into an industrially useful inorganic binder.

Other objects, and the manner in which the same are attained, will become apparent as this specification proceeds.

The invention contemplates to use quicklime, CaO, as the neutralizing agent for $CaSO_4$. While other agents, such as calcium hydroxide, $Ca(OH)_2$ and calcium carbonate, $CaCO_3$, were also carefully investigated, the quicklime, according to the present invention, was found to yield critically superior results with respect to the recovery as well as the uses of the inorganic binder obtained from the synthetic anhydrite.

An anhydrite with a $CaSO_4$ content of roughly 90 percent and prior to neutralization, a $H_2SO_4$ content of 10.4 percent, was tested with the results shown on the following table.

TABLE

*Comparison of neutralizing agents*

CHEMICAL CHARACTERISTICS OF THE NEUTRALIZED ANHYDRITE

|  | Neutralized with— | | |
| --- | --- | --- | --- |
|  | $CaCO_3$ | CaO | $Ca(OH)_2$ |
| $CaSO_4$ content_____percent__ | 89.2 | 90.99 | 89.23 |
| Excess of neutralizing agent_____do___ | 0.78 | 0.60 | 1.15 |
| Calculated on CaO_____do____ | 0.44 | 0.60 | 0.87 |
| Water: | | | |
|   Physically bound (moisture)_do___ | 1.39 | 0.63 | 0.53 |
|   Chemically bound (water of hydration)_____percent__ | 2.68 | 1.79 | 3.21 |

MORTAR-TECHNOLOGICAL EXAMINATION

|  |  |  |  |
| --- | --- | --- | --- |
| Fineness of grinding (residue on sieve of 0.09 mm.)_____percent__ | 8.39 | 6.13 | 6.73 |
| Water required in preparation of mortar_____percent__ | 23 | 25 | 30.5 |
| Crushing strength in kg./cm.²: | | | |
|   after 1 day_____ | 190 | 274 | 204 |
|   after 7 days_____ | 243 | 334 | 259 |
|   after 14 days_____ | 328 | 453 | 344 |
| Moisture content in percent by weight: | | | |
|   after 1 day_____ | 11.6 | 10.2 | 13.6 |
|   after 7 days_____ | 3.60 | 2.88 | 3.80 |
|   after 14 days_____ | 1.07 | 0.85 | 1.31 |
| Additional observations: Efflorescences on the test specimen of mortar_____ | Yes___ | No_____ | No. |

The further examination resulted in the following findings:

NEUTRALIZATION WITH $CaCO_3$

*Strong lump formation.*—The lumps were large-sized, with diameters of 5 to 6 cm. A part of the lumps were so hard that they could not be crushed by the pressure of a finger. The majority of the lumps could be crushed only by a strong pressure of the finger.

The pH value was subject to wide variations. A part of the lumps had a pH value of 2–3, whereas the more finely subdivided constituents had a pH value of 6–7.

These phenomena, manifestly, are due to the fact that the neutralization with $CaCO_3$ does not proceed to the end, but is arrested and remains incomplete. The anhydrite contains acidic zones which absorb water, form lumps and harden. This derives also from the high moisture content of 1.39 percent and the high content of water of hydration of 2.68 percent, in the neutralized anhydrite.

Not much strength is developed, and the mortar dries slowly.

The anhydrite thus obtained has little utility, if any.

NEUTRALIZATION WITH $Ca(OH)_2$

*Only minor lump formation.*—The lumps have sizes not substantially exceeding 10 mm. The lumps can be crushed with the finger quite readily.

*The pH value.*—While there are variations, these are of a minor character. The pH value varies between about 7 and 9. The total specimen has a strong alkaline reaction.

Although the neutralization appeared complete and uniform, the development of strength was found to be unsatisfactory, a phenomenon which is due, essentially, to the large quantity of water added (30.5 percent). It appears that the larger the quantity of water added, the lower the strength.

The excessive requirement of water is caused by the fact that in the neutralization with $Ca(OH)_2$, 2 molecules of water are liberated; these molecules are adsorbed by the anhydrite and are present therein, essentially, in the form of semi-hydrate (cf. the content of water of hydration of 3.21 percent). In cases of this kind, the requirement of water is known to rise sharply.

This requirement of large quantities of water, materially impairs the usefulness of the anhydrite thus obtained.

NEUTRALIZATION WITH CaO

Only very slight lump formation.

The pH value varies between about 6 and 9. The total specimen has a strongly alkaline reaction.

The development of strength proceeds very favorably. It is superior, by about 50 percent, to the corresponding characteristics of the test specimen neutralized with $CaCO_3$ or $Ca(OH)_2$, respectively. Moreover, this anhydrite dries much more quickly than the anhydrites obtained by the other neutralization procedures.

Manifestly, on the basis of the above results alone, the critical superiority of quicklime (CaO) as the neutralizing agent for $CaSO_4$ appears established. Yet, there are additional distinctive features of the quicklime neutralization which invest this procedure with additional advantages.

If the three neutralizing agents discussed above, are compared on the basis of their respective CaO contents, they show that—

$CaCO_3$ has a CaO content of 50.3 percent,
$Ca(OH)_2$ has a CaO content of 71.6 percent, and
CaO has a CaO content of 94.8 percent.

In consequence, the quantity of neutralizing agent required, in the case of $CaCO_3$, is about twice that of the quantity needed when using CaO.

In other words, when quicklime is used according to the invention, a much smaller quantity is needed, and the danger of introducing impurities into the anhydrite, is materially reduced in consequence. This is a signal advantage as the anhydrite is highly sensitive with respect to impurities. Besides, the excess of neutralizing agent can be reduced materially, and the anhydrite recovered thus is of greater purity. On neutralization with $CaCO_3$, however, the mortar contains white impurities (probably gypsum and remnants of $CaCO_3$) as well as black constituents which so far, have defied analysis. The quicklime neutralization according to this invention has the further advantage that due to the complete binding of any free sulfuric acid, the danger of corrosion of the grinding, conveying and storage equipment is substantially eliminated.

An additional, important advantage of the procedure of the invention resides in the following phenomena. When quicklime comes into contact with water, a large quantity of heat, 15,000 cal./mol, is set free. This heat development assists the neutralization process by causing the water liberated in the course of the neutralization, to evaporate more readily, with the result that it is no longer readily absorbed by the anhydrite. In industrial practice, the neutralization is effected while the $CaSO_4$ is still at elevated temperature; the heat generated on contact of the quicklime with water, serves to raise this temperature still further. In contradistinction to this favorable characteristic of the present procedure, the neutralization with $CaCO_3$ requires heating.

While the anhydrite neutralized with CaO has a pure white appearance, the anhydrite obtained by neutralization with $CaCO_3$ has an unattractive greyish color which in itself, militates against its use for many purposes.

The synthetic anhydrite prepared according to the present invention is useful for a variety of purposes, principally in the domain of building construction. Thus, it has demonstrated an excellent usefulness in plastering work, floors, floating mortar layers, pipe casings, fireproof casings for steel parts, prefabricated building elements, and sulfate plant cement. Another important application is in the field of adhesives.

Inasmuch as most of the synthetic anhydrite produced today, is recovered in a continuous process, the present invention is of great commercial significance.

I wish it to be understood that I do not desire to be limited to the details of method, operation and proportions of constituents described above as variations within the scope of the appended claims and involving no departure from the spirit of the invention nor any sacrifice of the advantages thereof, will occur to persons skilled in the art.

I claim:

1. A process for recovering synthetic anhydrite, for use as an inorganic building material binder, from the calcium sulfate sludge produced by the continuous process of manufacture of hydrofluoric acid through action of sulfuric acid on calcium fluoride, the said sludge consisting substantially entirely of a major proportion of anhydrous calcium sulfate and a minor proportion of substantially anhydrous sulfuric acid, comprising mixing dry calcium oxide with the sludge in an amount sufficient to neutralize the sulfuric acid, and allowing the neutralization to proceed to completion.

2. The process of claim 1 in which the sludge contains about 10% of sulfuric acid.

3. The process of claim 1 in which the quantity of calcium oxide used is in excess of the theoretical quantity required to neutralize all the sulfuric acid.

References Cited in the file of this patent

UNITED STATES PATENTS

| | | |
|---|---|---|
| 1,900,381 | Hansen | Mar. 7, 1933 |
| 2,151,339 | Sullivan | Mar. 21, 1938 |
| 2,197,953 | Sullivan | Apr. 23, 1940 |
| 2,418,590 | Linzell et al. | Apr. 8, 1947 |
| 2,574,507 | Weber | Nov. 13, 1951 |
| 2,606,129 | Weber | Sept. 5, 1952 |
| 2,608,491 | Weber | Sept. 26, 1952 |
| 2,655,430 | Schiermeier | Oct. 13, 1953 |